April 15, 1924.
E. G. HATCH
ATTACHMENT FOR ICE CREAM FREEZERS
Filed Jan. 25, 1922
1,490,269
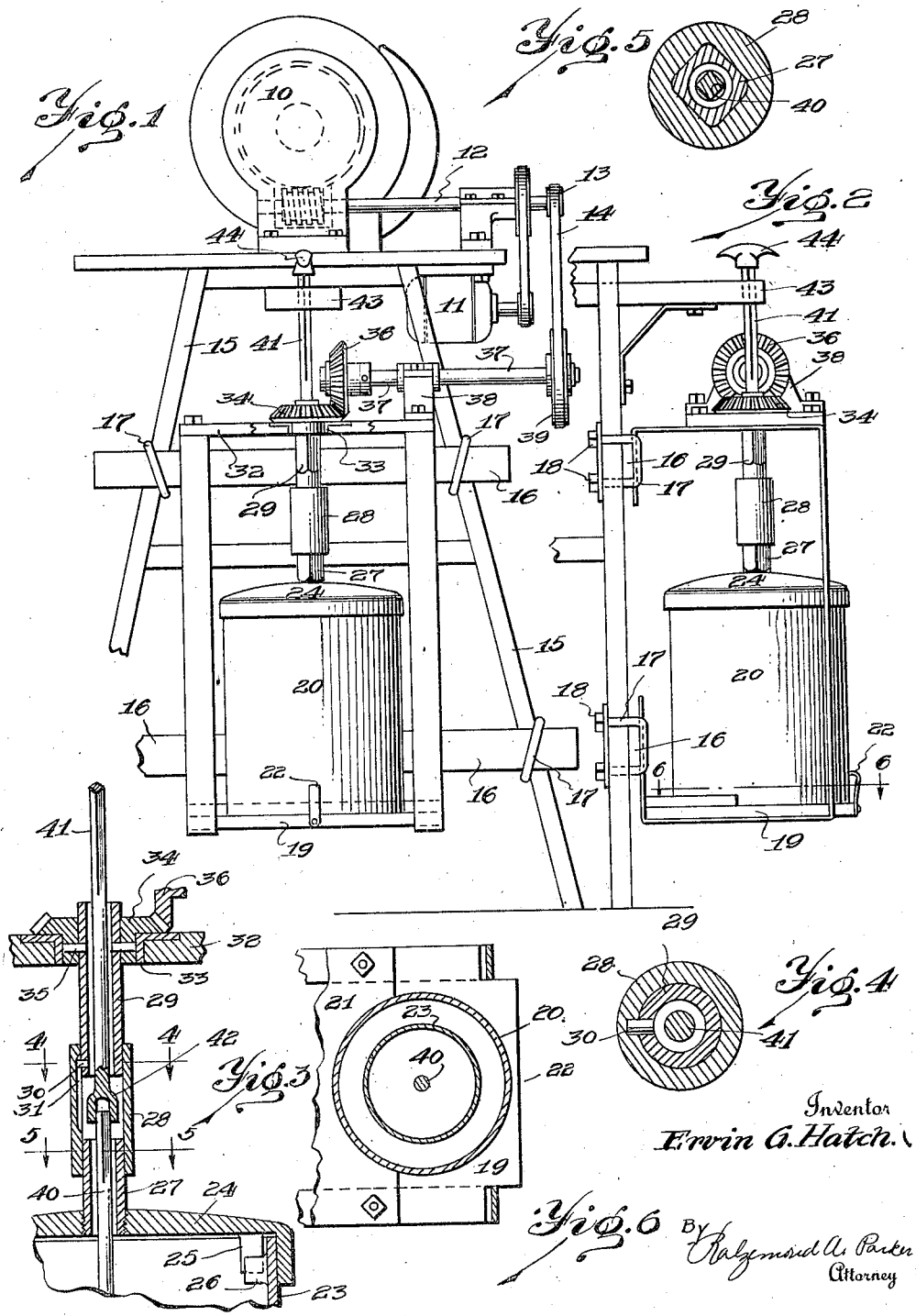
Inventor
Ervin G. Hatch.
By Raymond A. Parker
Attorney Patented Apr. 15, 1924.

1,490,269

UNITED STATES PATENT OFFICE.

ERVIN G. HATCH, OF BIRMINGHAM, MICHIGAN.

ATTACHMENT FOR ICE-CREAM FREEZERS.

Application filed January 25, 1922. Serial No. 531,675.

*To all whom it may concern:*

Be it known that I, ERVIN G. HATCH, citizen of the United States, residing at Birmingham, county of Oakland, State of Michigan, have invented a certain new and useful Improvement in Attachments for Ice-Cream Freezers, and declare the following to be a full, clear, and exact description of the same, such as will enable others skilled in the art to which it pertains to make and use the same, reference being had to the accompanying drawings, which form a part of this specification.

My invention relates to an attachment for an ice cream freezer, or other similar household appliance.

The object is to provide, in connection with an ice cream freezer or other similar household appliance having a rotatably driven member, means for supporting said appliance and coupling the same with an external prime mover to be driven therefrom.

More particularly the object is to provide a cage or supporting stand having self contained driving mechanism adapted to be coupled with an external prime mover for driving, which cage is adapted to removably receive and support an ice cream freezer in coupled alignment with the driving mechanism of the cage so that the freezer may be driven thereby. The cage is likewise adapted to be removably secured to the frame of a machine, such as an ironer, which machine is equipped with a power unit.

I have provided a simple, inexpensive cage or frame which may be detachably secured to the framework or supporting standards of an ironer. This cage occupies very little room, is positioned out of the way, and is rigidly secured to the framework of the ironer. The cage is provided with its own system of gearing which is adapted to be releasably coupled with a freezer carried by the cage so as to operate the freezer. The gearing is likewise adapted to engage with an external prime mover such as the motor which drives the ironer.

The above objects together with details of construction will more fully appear from the following description, appended claim and accompanying drawings, in which:

Figure 1 is an end view of an ironer showing my improved freezer attachment secured thereto.

Fig. 2 is a fragmentary view of the ironer showing my freezer attachment at a right angle to the view taken in Fig. 1.

Fig. 3 is a longitudinal section through the coupling which connects the driven shaft of the driving mechanism with the driving shaft of the freezer mechanism.

Fig. 4 is a cross section taken on line 4—4 Fig. 3.

Figure 5 is a cross section on line 5—5 of Figure 3.

Figure 6 is a cross section on line 6—6 of Figure 2.

In the drawings I have shown my improved device as secured to the end of the well known type of Simplex ironing machine. It is apparent that this freezer supporting cage might be attached to any suitable machine provided with a power plant. The type of ironer mentioned, however, is peculiarly well adapted for the support of this freezer cage and for driving the mechanism.

In assembly, the ironer is indicated as 10, provided with a motor 11, supported below the table of the ironer, having a driven shaft 12, provided with a pulley 13. A belt 14 is driven by the pulley 13. The supporting framework or legs of the ironer are indicated as 15. My improved freezer stand or cage is provided with cross members 16, which are adapted to be secured to the legs of the ironer by means of bolts 17 which bolts are provided with nuts 18.

The cage has a floor 19 which is adapted to support an ice cream freezer, or other similar household appliance, 20. I have provided means for removably supporting the freezer in alignment with the driving mechanism of the cage, by means of a floor piece 21 secured to the floor 19 and which floor member 21 is cut away, to partially embrace the freezer can as shown in Fig. 6. A pivoted latch member 22 is provided to hold the freezer in place against the floor member 21.

The freezer is provided with a rotatable element and a stationary element. In the construction shown in the drawings this rotatable element is the ingredient container. The stationary element is the stirring element which carries the paddles and is disposed within the ingredient container. It is apparent that the construction might be reversed and the stirring element rotated while the container was held stationary.

These several constructions are common practice. The construction shown in the drawing however has been thought most adaptable and to be preferred in connection with my invention. The rotatable element, whichever construction is used, is adapted to be engaged by mechanism carried by the cage for power operation.

I have shown the freezer can or ingredient container 23 provided with a removable cover 24 which cover is provided with a lug 25 adapted to engage with a lug 26 on the cam to rotate the can from the cover in the well known manner. Secured to the cover is an upwardly extending hollow shaft 27, squared at its free end as shown in Fig. 5 so as to be engaged by a coupling member 28 to rotate therewith. This coupling member 28 is keyed to a hollow shaft 29 which shaft forms a part of the gearing provided on the cage, by means of the key 30, which key is disposed within the keyway 31, so that the coupling member rotates as one piece with the shaft 29, but has a permitted longitudinal movement relative thereof.

Mounted rigidly on the cage is a supporting plate 32 provided with a bushing 33 within which bushing is mounted the hub of a beveled driving gear which gear is secured to the hollow shaft 29 by means of a pin 35. This gear 34 is enmeshed with gear 36 which is mounted on the shaft 37. Shaft 37 is supported by the bearing 38 which forms a part of the cage and the shaft carries at its outer end a pulley 39 which is engaged by the belt 14 driven from the pulley 13. The described construction provides a driving mechanism for rotating the freezer can 23.

It is desirable that convenient means be provided to hold the stationary element disposed within the container against rotation. The shaft 40 of this stationary element extends upwardly through the hollow shaft 27 and beyond the end thereof and is squared on its upper end as shown in Fig. 5. Means are provided in the form of a securing spindle 41 disposed within the hollow shaft 29, which spindle extends downwardly within the coupling member 28 and is provided at its lower end with a socket adapted to engage the squared end of the shaft 40 as shown in Fig. 3. This spindle is mounted in a stationary guide 43 so as to be held against rotation, while permitting its longitudinal movement and is provided at its upper end with a handle 44 by means of which it may be manually raised or lowered.

In the operation of the mechanism the driving shaft 37 is driven from the pulley 13 on the motor shaft by means of the belt 14 and pulley 39. Through the bevel gears 36 and 34 the hollow shaft 29 is rotated which by means of the coupling 28 rotates the shaft 27 and the freezer can 23 through the cover.

The securing spindle 41 held against rotation by means of the guide 43 and engaging the shaft 40 holds the stationary stirring element against rotation while the freezer can is being rotated.

The cage may be left secured to the framework of the ironer or detached therefrom when not in use. The freezer itself may be removed from the cage when not in use when desired. When the freezer is positioned within the cage and moved into position against the floor board member 21 it is brought into alignment so that the coupling member 28, when lowered, will engage the squared end of the shaft 27 to rotate the can. The spindle 41 may then be lowered so that the socket 42 will engage the upper end of the shaft 40 to prevent rotation thereof. The device is then ready for operation.

What I claim is:

In combination, an ice cream freezer comprising a can, a removable cover for the can adapted to releasably engage the same for rotation, a hollow axial stub shaft extending upwardly from the cover, an independent stirring element positioned within the can and having a shaft which extends upwardly through the hollow shaft of the cover, a freezer cage having driving mechanism adapted to be engaged for operation by an external prime mover, said driving mechanism comprising in association with driving gears a hollow drive shaft, a tubular coupling keyed to said shaft to rotate therewith but having relative slidable movement thereon, which coupling is adapted to releasably engage the hollow shaft of the freezer can cover for rotation, a securing spindle extending through the hollow drive shaft of the cage and having a socket at the lower end to releasably engage the end of the shaft of the stirring element to prevent rotation thereof, said securing spindle mounted in a rigid support for vertical movement and against rotation.

In testimony whereof I sign this specification.

ERVIN G. HATCH.